United States Patent [19]

Barton

[11] Patent Number: 5,309,668
[45] Date of Patent: May 10, 1994

[54] DEVICE FOR TRAPPING INSECTS

[76] Inventor: F. W. Barton, Rte. 3 Box 439 Goodsprings Rd., Aiken, S.C. 29801

[21] Appl. No.: 990,427

[22] Filed: Dec. 15, 1992

[51] Int. Cl.$^5$ .............................................. A01M 1/10
[52] U.S. Cl. ......................................... 43/121; 43/122
[58] Field of Search .......................... 43/121, 122, 107; 428/105, 247, 255

[56] References Cited

U.S. PATENT DOCUMENTS

| | | | |
|---|---|---|---|
| 914,571 | 3/1909 | Heath | 43/107 |
| 1,085,329 | 1/1914 | Gabel | 43/121 |
| 1,139,717 | 5/1915 | Pipenhagen | 43/121 |
| 1,209,993 | 12/1916 | Oettinger | 43/121 |
| 1,250,007 | 12/1917 | Phillips | 43/121 |
| 1,629,402 | 5/1927 | March | 43/121 |
| 1,786,599 | 12/1930 | Bullock | 43/107 |
| 1,822,307 | 9/1931 | Nettekoven | 43/121 |
| 1,867,252 | 7/1932 | Crigler | 43/121 |
| 2,372,747 | 4/1945 | Sullivan | 43/121 |
| 2,552,997 | 5/1951 | Nelson | 43/121 |
| 2,796,696 | 6/1957 | Kea | 43/121 |
| 3,365,352 | 1/1968 | Van Burleigh | 428/255 |
| 4,208,828 | 6/1980 | Hall | 43/121 |
| 4,348,444 | 9/1982 | Craig | 428/447 |
| 4,410,587 | 10/1983 | Fair | 428/105 |

FOREIGN PATENT DOCUMENTS

| | | | |
|---|---|---|---|
| 0165222 | 2/1950 | Japan | 43/122 |

Primary Examiner—P. Austin Bradley
Assistant Examiner—James Miner
Attorney, Agent, or Firm—Michael A. Mann

[57] ABSTRACT

A self-contained entry device for use with a bottle for preferably trapping roaches and similar crawling insects. The entry device comprises a mesh material shaped to form a truncated cone having a narrow strip extending from the larger opening of the cone. The smaller opening of the cone, preferably having an oval cross section, is inserted firmly into the mouth of a bottle or other receptacle containing bait for the insects. The narrow strip, extending from the larger, non-inserted opening, functions as a ramp allowing insects to crawl into the entry device and subsequently gain entrance into the bottle. Once inside the bottle, insects cannot maneuver themselves back through the smaller opening due to its size, shape and position within the bottle.

20 Claims, 2 Drawing Sheets

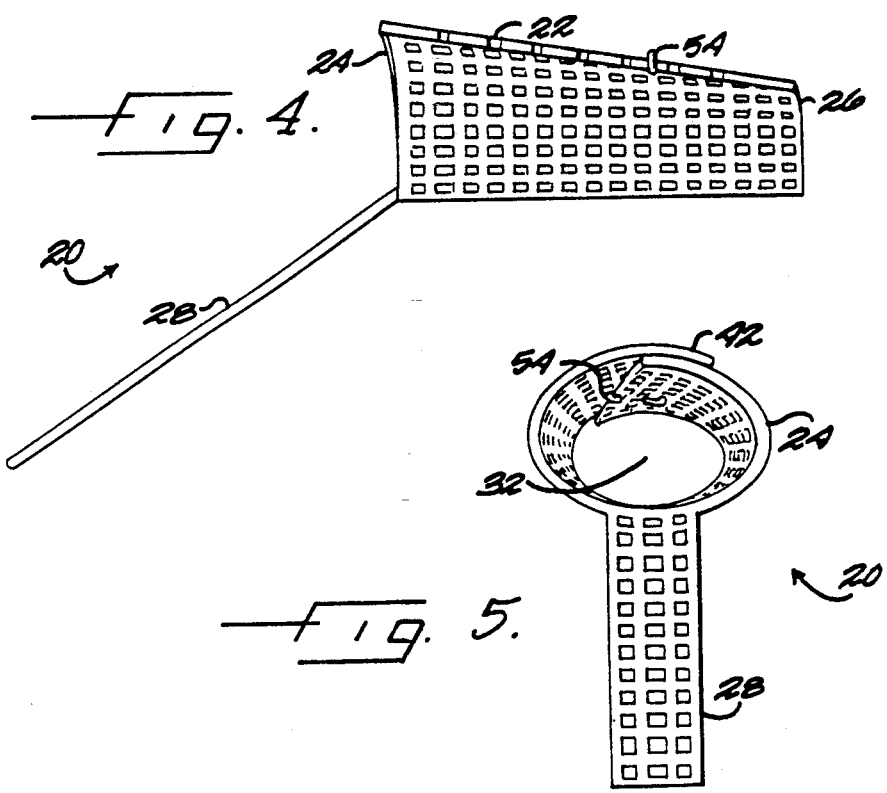
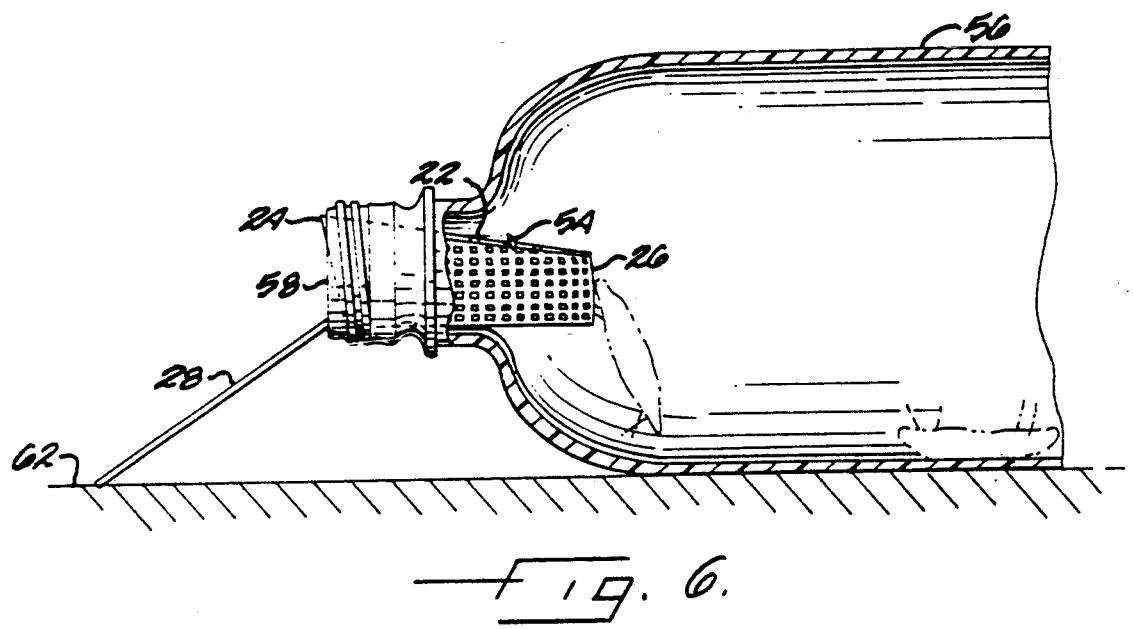

DEVICE FOR TRAPPING INSECTS

BACKGROUND OF THE INVENTION

1. Field of the Invention

The present invention relates to devices for trapping roaches and other insects. More particularly, the present invention relates to a passive device for use with a bottle for trapping roaches.

2. Discussion of Background

Devices for trapping crawling insects, such as roaches and the like, have been well known for some time. For instance, prior to 1958, U.S. patents were issued to Kea (U.S. Pat. No. 2,796,696), Nelson (U.S. Pat. No. 2,552,997), Crigler (U.S. Pat. No. 1,867,252), Phillips (U.S. Pat. No. 1,250,007) and Pipenhagen (U.S. Pat. No. 1,139,717) specifically for roach traps. Additionally, U.S. Pat. No. 1,822,302, issued to Nettekoven, U.S. Pat. No. 1,085,329, issued to Gabel, and U.S. Pat. No. 1,629,402, issued to March, all disclose traps for roaches and other crawling insects.

All of the insect traps described in the prior art use some type of receptacle, including milk bottles and glass fruit jars, having means for allowing crawling insects to gain entrance into the receptacle. Various entry means are described, including conical tubes, attachable ramps, canvas strips and wire mesh tunnels.

For example, Crigler (U.S. Pat. No. 1,867,252), March (U.S. Pat. No. 1,085,329) and Pipenhagen (U.S. Pat. No. 1,139,717) all disclose a frusto-conical member, attached to the mouth of a glass jar, extending into the interior of the jar. In operation, insects crawling into the conical member, fall into the jar, and are unable to exit the jar through the member.

Nelson and Gabel both disclose ramps for allowing crawling insects to gain entry into trapping receptacles from ground level. In Gabel (U.S. Pat. No. 1,085,329), a conical member, similar to those previously described, is equipped with a wide plate that provides a ramp between ground level and the mouth of the conical member, which begins at the mouth of the receptacle jar. In Nelson (U.S. Pat. No. 2,552,997), a ramp with a tubular port attached at one end attaches to the lip of a milk bottle so that the port extends into the interior of the bottle.

Although roach traps have been well known for years, there is a need for an effective trap that is simple, inexpensive, easily assembled, and disposable.

SUMMARY OF THE INVENTION

According to its major aspects and broadly stated, the present invention is a trap for crawling insects, such as roaches and the like. In particular, it is an entry device for use with an ordinary beverage bottle for trapping roaches and similar crawling insects. The entry device comprises a mesh material of a particular shape that allows it to be formed into a truncated cone with a narrow strip extending from the larger end of the cone. The smaller opening of the cone, preferably having an oval cross section, is inserted firmly into the mouth of the bottle or other receptacle after bait has been inserted. The narrow strip, extending from the larger, non-inserted opening, functions as a ramp that allows insects to crawl through the entry device and into the bottle. Once inside the bottle, crawling insects cannot maneuver themselves back through the smaller opening due to its size, shape and position within the bottle.

The present invention does not use insecticides, powders, glues or toxic fluids. Moreover, the present invention does not require an energy source and has moving parts. Thus, the present invention does not pose a hazard to people, especially children, pets and the environment that other insect traps do. Furthermore, the present invention is simple to make and use, inexpensive, and potentially reusable.

A major feature of the present invention is the flexibility and resiliency of the material used to make the entry device. Because the entry device is made preferably from a flexible, resilient plastic mesh, it functions as a self-sealing device that can easily adapt to fit into the mouths of various sizes of bottles or other receptacles. Thus, one entry device can fit into more than one bottle, including disposable plastic drink bottles, making the device reusable. The resiliency allows the device to be firmly seated or wedged in bottle with larger or smaller mouths, yet, if desired, be removed quickly and easily.

Another feature of the present invention is the texture of the entry device. The entry device is preferably made from a thin, plastic mesh. The advantage of this feature is that roaches and other insects can easily crawl on mesh material; that is, the material has a texture that crawling insects like roaches can grab onto.

Yet another feature is the preferred fastening method for forming the truncated cone. The device is preferably fastened at the smaller end of the truncated cone by stapling one end of the trapezoidal part to the other end with a slight overlap so that the cross section of the stapled end is slightly oval rather than round. The oval shape makes it easy for the insect to exit the cone thereby entering the bottle but difficult for it to reenter the cone in an attempt to escape.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 4 is a side view of the insect trap of FIG. 3;

FIG. 5 is a front view of the insect trap of FIG. 3; and

FIG. 6 is a side view of the insect trap of FIG. 3 showing its use with a plastic bottle.

DETAILED DESCRIPTION OF A PREFERRED EMBODIMENT

Figure 1:
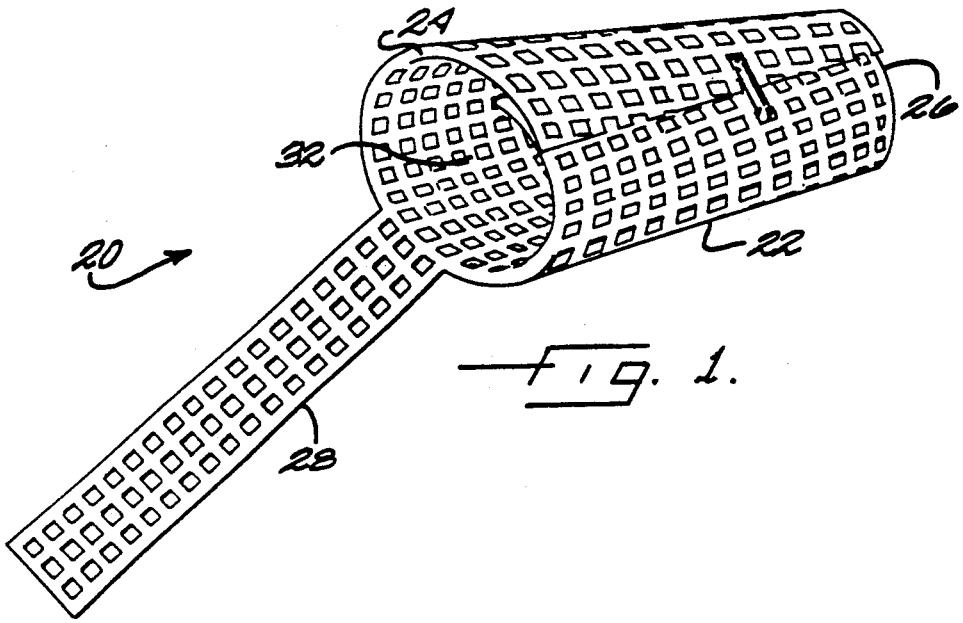
FIG. 1 is a perspective view of an insect trap according to a preferred embodiment of the present invention.

In the following description similar components are referred to by the same reference numeral in order to simplify the understanding of the sequential aspect of the drawings.

Referring now to FIG. 1, the insect trap 20 in its preferred embodiment is a truncated cone 22 having a large end 24 and a small end 26. A rectangular strip or stem 28 extends from large end 24. Cone 22 forms an opening 32, which gradually decreases in cross-section from large end 24 to small end 26, for roaches and similar insects to crawl through.

Figures 2, 3:
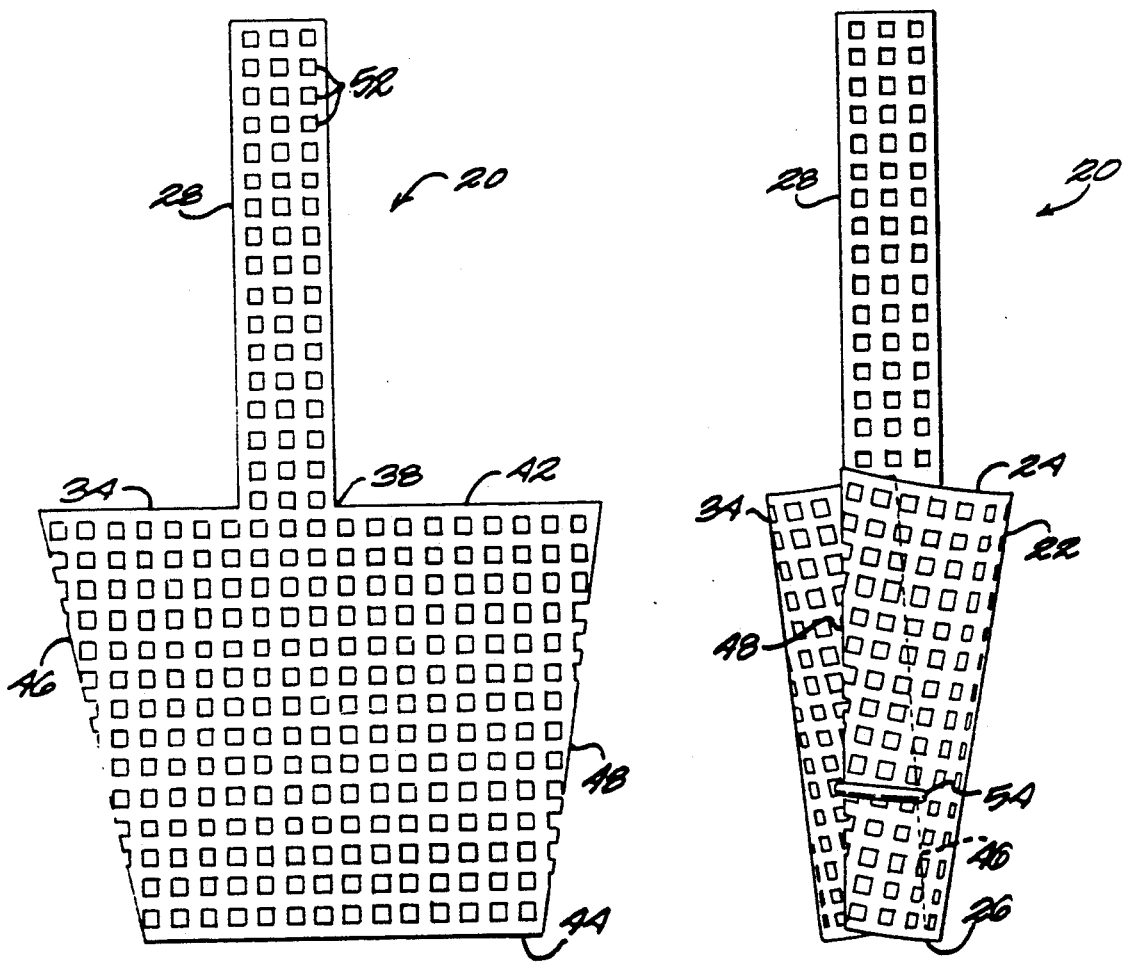
FIG. 2 is a plan view of the insect trap of FIG. 1 prior to assembly.
FIG. 3 is a plan view of the insect trap of FIG. 2 showing the formation of the trap when in use.

Referring to FIG. 2, insect trap 20 is preferably made from a flexible mesh material, preferably a plastic mesh, formed or otherwise cut into a shape having two parts: a symmetric, trapezoidal-shaped body 34 and stem 28, which is a long, rectangular-shaped strip. Body 34 and stem 28 are preferably integral at a location 38, thus insect trap 20 is comprised of a single piece of material. Alternatively, body 34 and stem 28 can be separate parts that are subsequently connected at location 38.

Body 34 has a pair of parallel sides 42, 44 and a pair of non-parallel sides 46, 48. Stem 28, having a pair of short sides and a pair of long sides, attaches to and extends from approximately the middle of parallel side 42 through one of its short sides. In a preferred embodiment for use with most standard, plastic soft-drink bottles, trap 20 is formed so that stem 28 is approximately 2.5 inches by approximately 0.5 inches, and body 34 is approximately 2.25 inches along parallel side 44, approximately 2.5 inches along non-parallel side 46, approximately 3.0 inches along parallel side 42, and approximately 2.5 inches along non-parallel side 48.

Trap 20 is preferably made of material having a plurality of openings 52 existing throughout trap 20. It is important that trap 20 have openings 52 or a textured surface in order for crawling insects, such as roaches and the like, to travel along the surface of trap 20. It is especially important that stem 28 have openings 52, since stem 28, as will be discussed later in further detail, is used as a ramp for insects to ascend and gain entrance into opening 32.

In FIG. 3, trap 20 is shown in its operational orientation, with body 34 formed into truncated cone 22 by curling non-parallel sides 46, 48 together so that side 48 slightly overlaps side 46. A fastener 54, preferably a staple or other connecting means, is positioned toward small end 26 so that body 34 is fastened in the curled position, thus maintaining the shape of truncated cone 22.

In FIGS. 4-5, trap is oriented to show the shape of truncated cone 22 more clearly. For example, FIG. 4 shows the gradual decrease in cross-sectional area of opening 32 when moving from large end 24 toward small end 26. Also, the size and shape of opening 32 at small end 26, inherently an oval cross-section, is preferably dimensioned to be just larger than the cross-section of a roach or similar crawling insect.

Also, FIG. 4 shows the extension of stem 28 from large end 24 to what is essentially ground level (or the surface level on which trap 20 is placed). Thus, it can be seen that stem 28 is used as a ramp or means for allowing roaches, and similar crawling insects, to ascend to large end 24 and subsequently travel through opening 32 of truncated cone 22.

Referring now to FIG. 6, trap 20 is shown in use in a preferred embodiment with a plastic bottle 56, such as a soft-drink bottle or the like. Bottle 56 has a mouth 58 or other opening allowing the insertion of truncated cone 22. Trap 20 is preferably dimensioned so that when small end 26 of truncated cone 22 is inserted into mouth 58, truncated cone 22 becomes lodged snugly in mouth 58 and stem 28 extends out of mouth 58 down to a flooring surface 62. Preferably, truncated cone 22 becomes lodged in mouth 58 of bottle 56 only after small end 26 has been inserted past mouth 58 and well into the interior of bottle 56.

In use, trap 20, as shown in FIG. 2, is formed into truncated cone 22 having stem 28, as shown in FIG. 3. Stem 28 may be bent manually along location 38 (see FIG. 2) so that stem 28 extends slightly down and away from truncated cone 22, thus forming a ramp for crawling insects to ascent into opening 32, as shown generally in FIGS. 4-5.

Then, small end 26 is inserted into mouth 58 of bottle 56 until truncated cone 22 becomes lodged snugly in mouth 58. Preferably, a portion of bait (not shown), such as small pieces of apples, bananas, potatoes and the like, has been placed in bottle 56 before inserting trap 20 into mouth 58. Bottle 56 is then placed along flooring surface 62 of an area for trapping insects.

Bottle 56 is preferably oriented along flooring surface 62 so that stem 28 extends down to and rests along flooring surface 62. Roaches lured by the bait within bottle 56, ascend stem 28 to large opening 24. The roaches then travel through truncated cone 22 from large opening 24 to small end 26 until they enter bottle 56.

As previously stated, small end 26 is preferably dimensioned to the cross-section of a roach or similar crawling insect. In particular, the small diameter of small end 26 is oriented vertically and the large diameter horizontally. Thus, the shape of small end 26 and its position within the interior of bottle 56, coupled with the general shape of a roach, prevents a roach inside of bottle 56 from orienting its body properly to re-enter small end 26 in order to crawl out of truncated cone 22. Thus, roaches entering bottle 56 remain within bottle 56, where they perish shortly thereafter.

It will be apparent to those skilled in the art that many changes and substitutions can be made to the preferred embodiment herein described without departing from the spirit and scope of the present invention as defined by the appended claims.

What is claimed is:

1. A device made by a process, said device for use with a container and for trapping insects, said process comprising the steps of:

forming a material into a shape having a first portion and a second portion, said first portion being approximately trapezoidal wherein said first portion has two parallel sides and two non-parallel sides and wherein one of said parallel sides is a long side, said second portion being approximately rectangular and having sides wherein one of said sides is a short side, said short side of said second portion being joined to said long side of said first portion;

forming a truncated cone having a large open end and a small open end from said first portion of said material, said second portion extending from said large open end of said truncated cone; and fastening said cone near said small open end.

2. The device of claim 1, wherein said container has an interior and an opening for accessing said interior, further comprising the step of inserting said small open end of said truncated cone into said opening until said truncated cone is lodged within said opening, said second portion forming a ramp when said truncated cone is lodged in said opening, said ramp allowing said insects to access said device whereby said insects can enter said interior.

3. The device of claim 1, wherein said short side of said second portion is joined to said long side of said first portion at approximately the midpoint of said long side of said first portion.

4. The device of claim 1, wherein said shape forming step further comprises the step of cutting said material so that said first portion and said second portion are integral and said short side of said second portion is positioned at approximately the midpoint of said long side of said first portion.

5. The device of claim 1, wherein said material is a flexible and resilient material allowing said truncated cone to be inserted into and lodged within different sized openings.

6. The device of claim 1, wherein said material is a plastic mesh material that allows said insects to crawl along said material.

7. The device of claim 1, wherein said fastening step further comprises fastening said truncated cone so that said small open end has an oval cross section.

8. The device of claim 1, wherein said fastening step further comprises stapling said two non-parallel sides of said trapezoidal first portion together so that said two non-parallel sides overlap.

9. A method for making a device for use with a container and for trapping insects, said method comprising the steps of:

forming a material into a shape having a first portion and a second portion, said first portion being approximately trapezoidal wherein said first portion has two parallel sides and two non-parallel sides and wherein one of said parallel sides is a long side, said second portion being approximately rectangular and having sides wherein one of said sides is a short side, said short side of said second portion being joined to said long side of said first portion;

forming a truncated cone having a large open end and a small open end from said first portion of said material, said second portion extending from said large open end of said truncated cone; and fastening said cone near said small open end.

10. The method as recited in claim 9, wherein said container has an interior and an opening for accessing said interior, further comprising the step of inserting said small open end of said truncated cone into said opening until said truncated cone is lodged within said opening, said second portion forming a ramp when said truncated cone is lodged in said opening, said ramp allowing said insects to access said device whereby said insects can enter said interior.

11. The method as recited in claim 9, wherein said shape forming step further comprises the step of attaching said short side of said second portion to said long side of said first portion so that said short side of said second portion is positioned at approximately the midpoint of said long side of said first portion.

12. The method as recited in claim 9, wherein said shape forming step further comprises the step of cutting said material so that said first portion and said second portion are integral and said short side of said second portion is positioned at approximately the midpoint of said long side of said first portion.

13. The method as recited in claim 9, wherein said material is a flexible and resilient material allowing said truncated cone to be inserted into and lodged within different sized openings.

14. The method as recited in claim 9, wherein said material is a plastic mesh material that allows said insects to crawl along said material.

15. The method as recited in claim 9, wherein said fastening step further comprises fastening said truncated cone so that said small open end has an oval cross section.

16. The method as recited in claim 9, wherein said fastening step further comprises stapling said two non-parallel sides of said trapezoidal first portion together so that said two non-parallel sides overlap.

17. A method for making a device for use with a container and for trapping insects, said container having an interior and an opening for accessing said interior, said method comprising the steps of:

forming a material into a shape having a first portion and a second portion, said first portion being approximately trapezoidal wherein said first portion has two parallel sides and two non-parallel sides and wherein one of said parallel sides is a long side, said second portion being approximately rectangular and having sides wherein one of said sides is a short side, said short side of said second portion being joined to said long side of said first portion;

forming a truncated cone from said first portion of said material by positioning said two non-parallel sides together so that said two non-parallel sides overlap, said truncated cone having a large open end and a small open end, said second portion extending from said large open end;

fastening said cone near said small open end so that said small open end has an oval cross section; and inserting said small open end of said truncated cone into said opening until said truncated cone is lodged within said opening, said second portion forming a ramp when said truncated cone is lodged in said opening, said ramp allowing said insects to access said device whereby said insects can enter said interior.

18. The method as recited in claim 17, wherein said forming step further comprises the step of cutting said material so that said first portion and said second portion are integral and said short side of said second portion is positioned at approximately the midpoint of said long side of said first portion.

19. The method as recited in claim 17, wherein said material is a flexible and resilient material allowing said truncated cone to be inserted into and lodged within different sized openings.

20. The method as recited in claim 17, wherein said material is a plastic mesh material that allows said insects to crawl along said material.

* * * * *